Oct. 2, 1962 D. J. BIRMINGHAM ET AL 3,056,950
VERIFICATION OF MAGNETIC RECORDING
Filed Nov. 6, 1958 2 Sheets-Sheet 1

INVENTORS:
DONALD J. BIRMINGHAM
RALPH E. MONTIJO AND
JOHN P. REID
BY Morris [signature]
ATTORNEY Oct. 2, 1962 D. J. BIRMINGHAM ET AL 3,056,950

VERIFICATION OF MAGNETIC RECORDING

Filed Nov. 6, 1958 2 Sheets-Sheet 2

INVENTORS:
DONALD J. BIRMINGHAM,
RALPH E. MONTIJO AND
JOHN P. REID
BY Morris A. Rahtin
ATTORNEY United States Patent Office 3,056,950

Patented Oct. 2, 1962

3,056,950

VERIFICATION OF MAGNETIC RECORDING

Donald J. Birmingham, Santa Monica, Ralph E. Montijo, Sepulveda, and John P. Reid, Los Angeles, Calif., assignors to Radio Corporation of America, a corporation of Delaware Filed Nov. 6, 1958, Ser. No. 772,271

12 Claims. (Cl. 340—174.1)

This invention relates to recording devices wherein information in the form of signal pulses is recorded on a magnetic surface. More particularly, this invention relates to methods and apparatus for verifying that the signal pulses have been accurately recorded on the magnetic surface.

Most present day information handling systems perform operations on information expressed in binary form. In the binary system each different character, number, and the like may be represented by a discrete combination of binary digits, "ones" and "zeros." The binary "one" may, for example, be represented by the presence of a signal pulse, while the absence of a pulse may represent the binary "zero." File information is frequently recorded on magnetic tapes or drums. The accuracy and safety of this recorded information is often of paramount importance. As packing densities are increased, it becomes increasingly important to have a positive check on the accuracy of recording.

In the recording of digital data on a magnetic surface such as magnetic tape, precaution is usually taken to prevent the loss of information. Errors may be caused, for example, by imperfections in the magnetic tape and by inadequate contact between the tape and the magnetic recording head. If the accuracy of recording of each "bit" of information is checked on the same pass before the next "bit" is recorded, it is possible to detect errors immediately upon recording and to take such appropriate action as is deemed desirable if the information is incorrectly recorded.

A number of different systems are presently used for checking the recording accuracy. Some of these systems have the disadvantage that the recorded signal itself is not used in the checking process. In some systems, an interval of time elapses between the recording and checking, and other information is recorded on the tape during this interval. By the time the accuracy of recording is checked, the information may be lost if the recording is in error.

It is among the objects of the present invention to provide:

Apparatus for performing immediate read-after-write verification of magnetically recorded information;

A method of verifying that information signals have been recorded on a magnetic surface, which method makes use of the natural flux fringing of recorded signals about the air gap of the magnetic recording head;

A novel method of performing an immediate read-after-write check of magnetically recorded information using a single magnetic recording head having a single gap;

An inexpensive read-after-write verification system using only one magnetic recording head (with a single gap); and Apparatus for reading the trailing edge of a magnetically recorded signal immediately after said signal is recorded and before other signals are recorded.

In accordance with these and other objects, the voltage induced in the energizing coil of the magnetic head by the trailing edge of a recorded dipole as said dipole is moved relative to the head is detected and used as a positive indication that an information signal has been properly recorded. The output of the energizing coil is a large transient signal followed by a portion of the fringing signal.

The voltage transient may be 10,000 times greater in amplitude than the fringing signal. In a preferred embodiment the combined signal is applied to the input of detection apparatus where the input signal amplitude is limited to prevent paralysis of the various circuitry. This limiting is accomplished without loading down the magnetic head and write amplifier. The amplitude-limited signal is amplified and applied to an electronic switch or gate. The switch is strobed by a timing, or strobe, signal to separate the fringing signal from the voltage transient, thereby providing an output only in response to the fringing signal.

The foregoing and other objects, the advantages and novel features of this invention, as well as the invention itself both as to its organization and mode of operation, may be best understood from the following description when read in connection with the accompanying drawing in which like reference numerals refer to like parts and in which:

FIGURE 2 illustrates both separately and in combined form the voltage transient and fringing signals induced in the energizing coil of the magnetic head;

Figures 1A, 1B:
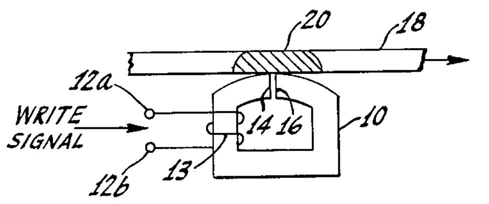
FIGURE 1 illustrates the method in which a magnetic head having a single air gap may be used to read the trailing edge of a magnetically recorded signal immediately after the recording thereof.

The method of using the natural flux fringing of a recorded signal pulse to perform read-after-write verification is illustrated in FIGURE 1. FIGURE 1(*a*) shows a magnetic tape 18 in contact with a magnetic recording head 10. The pole pieces 14, 16 of the head are separated by an air gap. By way of illustration, a typical magnetic head may have an air gap of 0.5 milli-inch in length. The magnetic tape 18 bridges the air gap as the tape moves in a left-to-right direction relative to the magnetic head. An energizing coil 13 is wound around a portion of the head 10, and signals to be recorded are applied across the terminals 12*a*, *b* of the coil 13. When signal current flows through the energizing coil, a magnetomotive force is generated in the head 10. Recording is effected when the resulting flux lines cross the air gap and penetrate the oxide coating on the magnetic tape 18. The recording is in the form of a magnetized spot 20 or dipole on the tape. In general, this dipole will be many times longer than the air gap because of the natural flux fringing due to the finite density of the oxide coating, saturation of the pole pieces, and design of the head, and is controllable.

If the lagging edge of the recording current pulse is sharply terminated and has died away, the trailing edge of the recorded dipole is encountered by the air gap some time after the current pulse termination. If all voltage transients associated with the recording pulse have decayed to a sufficiently low value at this time, it is possible to detect the voltage pulse induced in the head 10 by the trailing edge of the dipole 20. FIGURE 1(*b*) illustrates conditions in the recording system at a time after recording when the tape has moved a short distance relative to the magnetic head. At this time the trailing edge of the dipole 20 encounters the air gap. If the voltage transient induced in the energizing coil 13 by collapsing flux lines associated with the write signal has decayed sufficiently at this time, it is possible to read the trailing edge of the dipole 20. This method of checking the accuracy of recording makes use of the natural flux fringing about the air gap. The recording-reading head 10 is preferably designed so that the length of the recorded dipole 20 is just long enough to allow its trailing edge to be read at the fastest tape speed.

Figures 2A, 2B, 2C, 3:
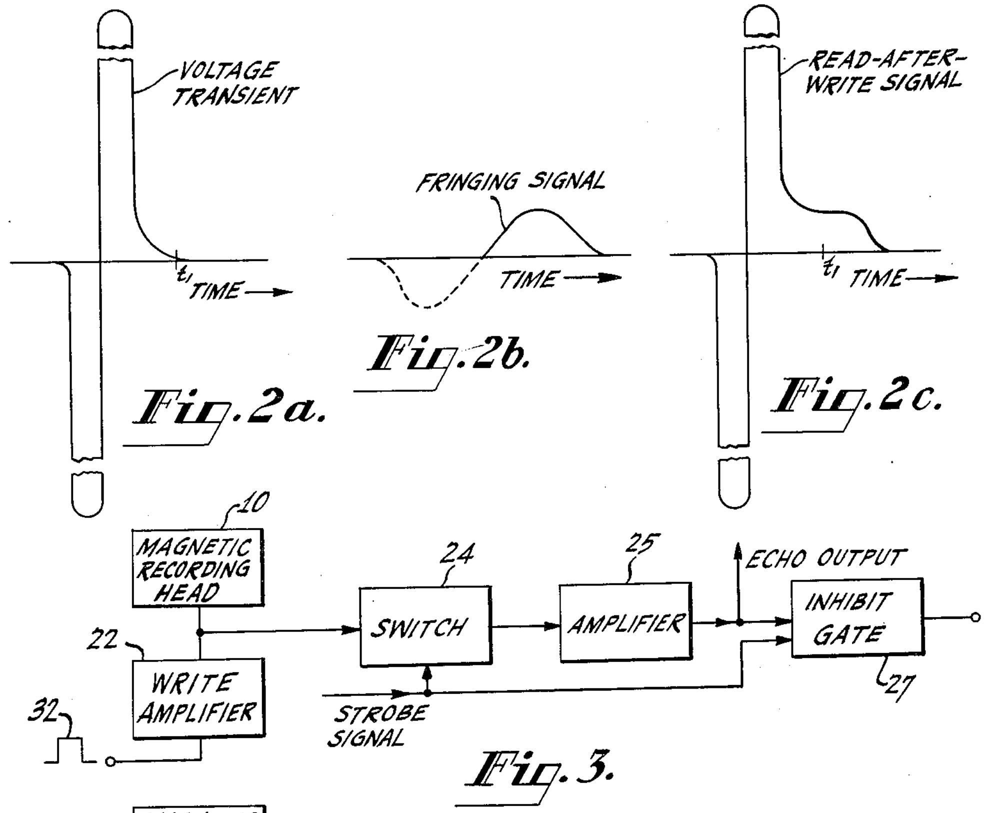
FIGURE 3 is a block diagram of one form of detection apparatus according to the present invention.

The amplitude of the voltage transient may be 10,000 times greater than the fringing or read signal. The voltage transient and fringing signals are plotted as functions of time in FIGURES 2*a, b,* respectively. The transient waveform has been broken away for obvious reasons. FIGURE 2*c* illustrates the combined voltage transient and fringing signal as it would appear across the terminals 12*a, b,* of the energizing coil 13. As may be seen in FIGURE 2(*a*), the voltage transient decays to a low value at time $t_1$. The magnitude of the combined signal at this time is substantially greater. If the output of the energizing coil were to be sampled at time $t_1$, or thereabout, a positive indication of the fringing signal would be obtained. It is thus possible to perform a read after-write check of recorded signals using a single magnetic head with a single air gap by sampling the output of the energizing coil at such time as the voltage transient associated with the write signal has decayed to a sufficiently low value.

One embodiment of the present invention is illustrated in FIGURE 3. Signals 32 to be recorded are amplified in a write amplifier 22 and applied to a magnetic recording head 10, illustrated in block form. The combined voltage transient and fringing signal are coupled from the head 10 to a switch 24. The switch is enabled by a strobe or gating pulse applied to the switch 24 when the voltage transient has decayed to a low value. The strobe signal may be the same as the input signal to the write amplifier suitably delayed. Alternatively, the strobe signal may be provided by a write clock timing generator. The output of the switch 24 represents the fringing signal and may be amplified in an amplifier 25 to provide a suitable level of output signal. This output signal, indicating that a corresponding signal was satisfactorily recorded, may be termed an echo signal. The output may be applied to utilization or indicating apparatus as desired. If it is desired to provide a signal indication only when the write signal has not been properly recorded on the magnetc tape, the output from the amplifier 25 may be applied as the inhibit input to an inhibit gate 27. The strobe signal may be applied as a second input to the inhibit gate. In a particular application, it may be desirable to change the shape or to delay the strobe signal before said signal is applied to the inhibit gate. An inhibit gate may be defined as a circuit having two inputs and one output, and which has the property that a signal is present on the output line only in the presence of a pulse on one input line and the absence of a pulse on the other input line. By properly arranging the inputs to the inhibit gate 27, the gate will provide an output in response to the strobe pulse only in the absence of a fringing signal. Thus an output from the amplifier 25 indicates that a signal has been properly recorded, while the output from the inhibit gate 27 indicates improper recording.

Inasmuch as the amplitude of the fringing signal is relatively small, it may be desirable in certain applications to amplify this signal before strobing. An amplifier designed to amplify the fringing signal must react quickly from the overload caused by the voltage transient and be ready to linearly amplify the small fringing signals. In order to avoid paralyzing the amplifier, it is desirable that the combined signal be clipped or limited.

Figure 4:
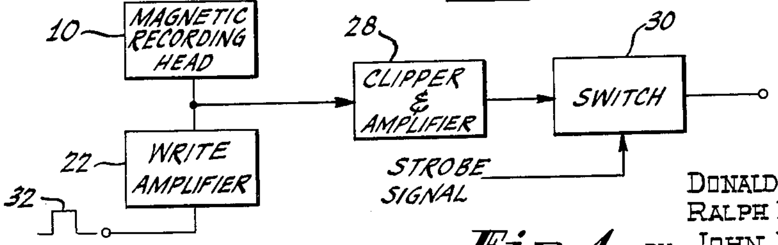
FIGURE 4 is a block diagram of a preferred form of detection apparatus.

FIGURE 4 is a block diagram of a preferred embodiment of the present invention. The combined signal from the recording head 10 is applied to a clipper and amplifier illustrated by the block 28. The clipper limits the combined input signal to a predetermined level to avoid paralysis of the amplifier. This amplitude limited signal is then amplified and applied to an electronic switch 30 which is strobed at a suitable time in the operating cycle. The switch output may be applied to an inhibit gate of the type described above if desired.

Figures 5, 6:
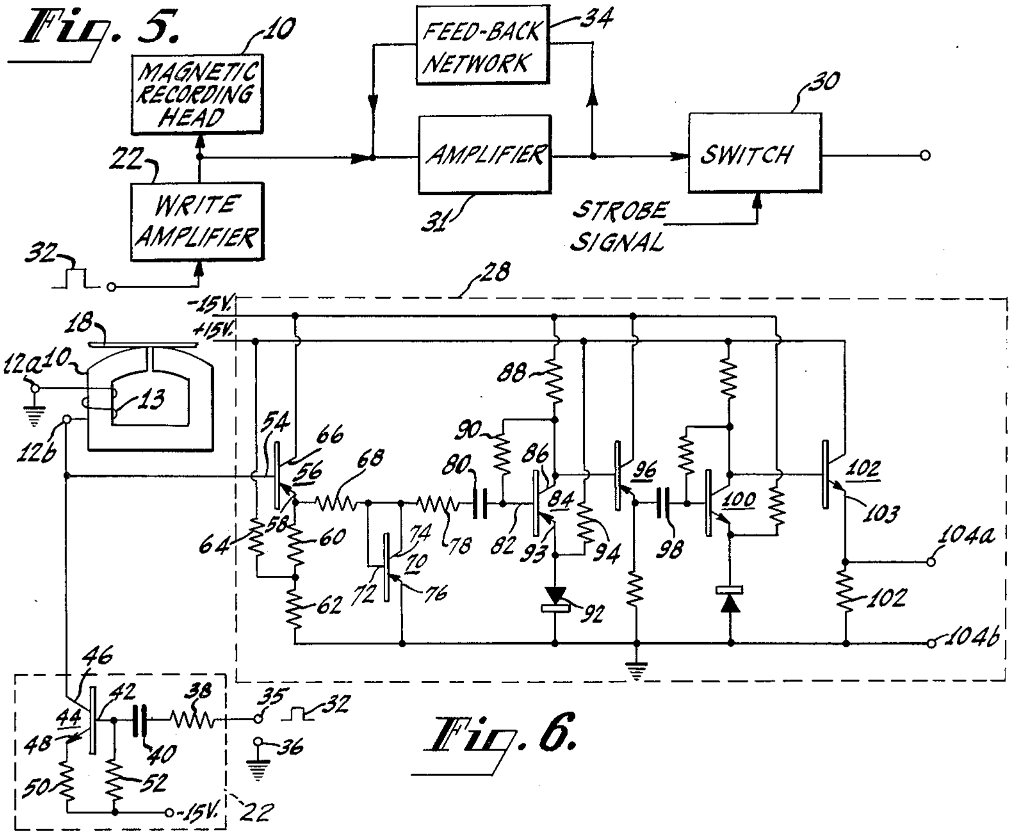
FIGURE 5 is a block diagram of still another form of detection apparatus.
FIGURE 6 is a schematic diagram of a clipper and amplifier suitable for practicing the present invention.

As an alternative, the clipper and amplifier 28 may be replaced by a nonlinear amplifier 31 having a negative feedback arrangement 34 as illustrated in FIGURE 5. For low signal levels, for example, when the voltage transient has decayed to a sufficiently low value, no feedback is provided. However, when the input signal level exceeds a certain predetermined value, very large reverse feedback is provided by the feedback arrangement 34. The output of the amplifier 31 is applied to the switch 30 which is strobed in the manner described above. The common connections between the various blocks in this figure and FIGURES 3 and 4 have been omitted for clarity.

A clipper and amplifier arrangement suitable for use in the preferred embodiment of FIGURE 4 is illustrated schematically in FIGURE 6. Write signals 32 to be recorded are applied across the input terminals 35, 36 of the write amplifier 22. The write signals 32 are coupled through a resistor 38 and capacitor 40 combination to the base electrode 42 of an NPN transistor 44. The emitter electrode 48 is connected through a resistor 50 to a source of negative potential, designated −15 v. The base electrode 42 is also connected through a resistor 52 to this same negative voltage source for biasing. The collector electrode 46 is connected to one terminal 12*b* of an energizing coil 13 which is wound around a portion of the recording head 10. The other terminal 12*a* of the coil is connected to a reference potential, indicated as circuit ground. The transistor 44 has preferably a high collector impedance and a low collector capacitance. Circuit parameters are selected so that a 6 volt input pulse will cause approximately 50 milli-amperes of recording signal current to flow in the collector circuit and through the energizing coil 13. This signal current causes a magneto-motive force to be generated in the recording head. Flux lines crossing the air gap magnetize a portion of the tape 18 adjacent the air gap.

The voltage transient resulting from the signal current and the fringing read signal induced in the coil 13 by the trailing edge of the recorded signal are coupled to the base electrode 54 of a PNP transistor 56. This transistor is connected in an emitter-follower stage which has a high input impedance. The high impedance prevents undue loading of the write amplifier 22 and magnetic head 10. The emitter electrode 58 is connected through a resistor 60 to the junction of a pair of resistors 62, 64. These resistors 62, 64 are connected as a voltage divider between circuit ground and a source of positive voltage, designated +15 v. The voltage divider arrangement biases the transistor 56 so that a signal of more than +200 milli-volts applied to the base electrode 54 will disable the transistor 56. The collector electrode 66 is connected to the −15 v. source to prevent saturation of the transistor in response to a negative input signal applied to the base electrode 54. The emitter electrode 58 is also connected through a resistor 68 to the base 72 and collector 74 electrodes of a transistor 70 arranged as a low forward resistance diode. The emitter electrode 76 of this diode is connected to ground. When the signal output of the emitter-follower is more than 200 milli-volts in the negative direction, it overcomes the junction potential of the base *n* and the diode 70 then presents a low impedance, thereby clipping the signal in the negative direction. The signal is coupled through the series combination of a resistor 78 and capacitor 80 to the base electrode 82 of a transistor 84 of a clipper-amplifier stage. The collector electrode 86 is connected through a resistor 88 to a source of negative voltage. A resistor 90 connected between the collector 86 and base 82 electrodes provides degenerative feedback for stability and frequency response.

As an amplifier in the linear region, the transistor 84 functions as a grounded emitter device. A diode 92 is connected between the emitter electrode 93 and ground, and poled in such a manner as to be back-biased by the normal transistor biases. It is forward biased, however, by an additional current source, a resistor 94 connected from the emitter electrode 93 to a source of +15 v. As the input signal to this stage increases, the emitter current also increases. When the emitter current becomes identical to the base bias current, the diode 92 will cut off. The values of the various components of this stage are selected so that the diode 92 will cut off before the collector saturates. When the diode 92 cuts off, it greatly increases the input impedance to the stage and reduces the gain accordingly. Clipping is thereby provided without saturating the stage. The large negative feed-back provides the stage with a short recovery time. The output of the clipper-amplifier is coupled to a conventional emitter-follower comprising a transistor 96. The output of this transistor 96 is coupled through a capacitor 98 to another clipper-amplifier comprising transistors 100, 102. This latter clipper-amplifier operates in a manner similar to the clipper-amplifier previously described and is identical except that NPN transistors are used. Further insurance against the possibility of saturation is provided by the latter stages. The output of the entire combination is developed across a resistor 102 connected between the emitter electrode 103 and ground. One 104*a* of a pair of output terminals is connected to the emitter side of the output resistor 102, the other terminal 104*b* being grounded. The output signal may be used in two ways. During a normal read operation it may be applied to a tape signal shaper or similar device. During read-after-write operation, it will be applied to a switch 30 as illustrated in FIGURE 4.

Figure 7:
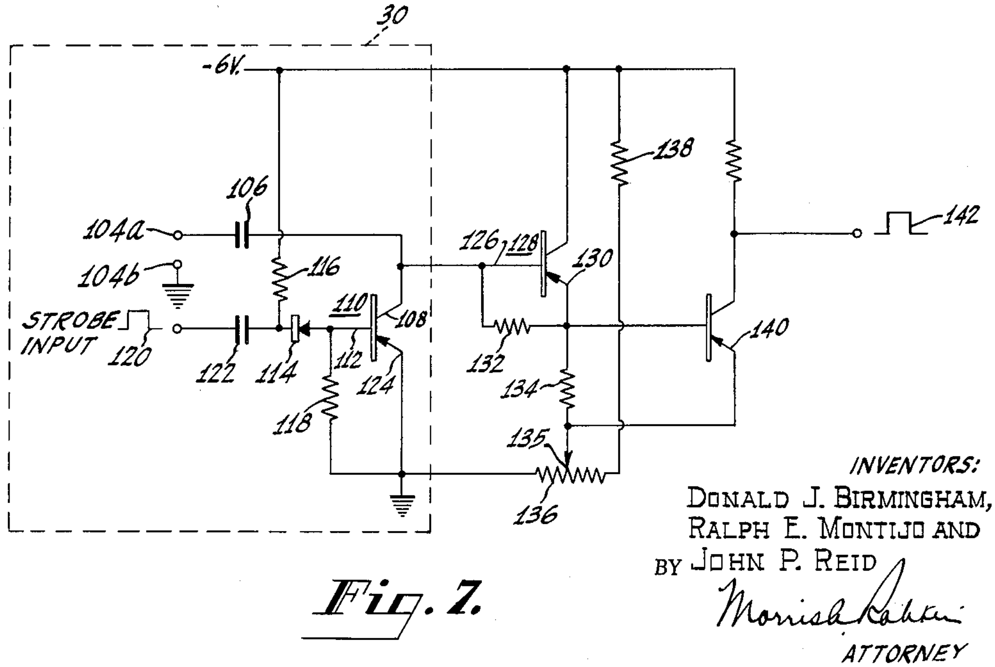
FIGURE 7 is a schematic diagram of an electronic switch or gate, discriminator and amplifier which may be used in the present invention.

FIGURE 7 illustrates an electronic switch 30, or gate, which may be used in the arrangement of FIGURE 4. The output of the clipper-amplifier is coupled through a capacitor 106 to the collector electrode of a transistor 110. The base electrode 112 of the transistor 110 is connected through the series combination of a diode 114 and a resistor 116 to a negative voltage source, designated −6 v. The base electrode is also connected through a resistor 118 to circuit ground. The combination of the resistors 116, 118 and diode 114 biases the base electrode 112 in such a manner that the transistor 110 is operated in a saturated condition in the absence of a strobe input pulse. The strobe pulse 120 is coupled through a capacitor 122 to the negative side of the diode 114. In the absence of the strobe input pulse 120, the collector electrode 108 is maintained close to ground potential due to the low collector-emitter impedance resulting from saturation. Input signals coupled to the collector electrode 108 are effectively shorted out under these conditions. The strobe pulses 120 are of such magnitude and polarity as to back-bias the diode 114 in the base circuit and drive the transistor 110 to cut off. In the cutoff condition the transistor 110 presents a high impedance between the collector 108 and emitter 124 electrodes, thereby permitting the output of the clipper amplifier 28 to be applied to the base electrode 126 of the transistor 128 in the following stage.

The transistor 128 is connected as an emitter-follower. The emitter electrode 130 is connected through a resistor 134 to an adjustable slide arm on a resistor 136, and also through a resistor 132 to the base electrode 126. The resistor 136 is connected in series with another resistor 138 between ground and the negative voltage source −6 v. The arm 135 is adjusted to bias the emitter-follower in such a way that it will discriminate against applied pulses below a certain predetermined amplitude. The circuit may thus be set to recognize only pulses above that certain amplitude as representing satisfactory recording.

The output of the emitter-follower is amplified and squared by a further stage comprising a transistor 140. An output 142 from this transistor 140 indicates that the write signal has been properly recorded on the magnetic surface. This output may be applied as an echo pulse to utilization or indicating devices as circumstances dictate.

The switch 30 or gate serves a function useful in addition to the switching function. The clipping circuits cannot be made entirely independent of the pulse repetition frequency. As long as the clipping zone contains the read signal, this switch circuit will compensate for any base line shift. It does this by clamping the input coupling capacitor 106 during the period preceding the application of the strobe pulse 120. Therefore, when the switch is opened in response to the strobe pulse, the input signal will always start from the same level.

The strobe pulse 120 may be derived in any suitable manner as is well known in the art. For example, the input signal 32 to the write amplifier 22 may also be applied to a delay circuit (not shown), and the output from the delay circuit may be used as the strobe pulse.

There has been described a novel method of obtaining a read-after-write indication of the accuracy of magnetic recording in which the actual recorded signal is read on the same pass of the magnetic tape. Many different apparatus may be used in practicing this method. an inexpensive and preferred embodiment of apparatus for performing this check has been shown and described.

What is claimed is:

1. In a method of verification employed in recording on a magnetic surface by means of a recording head having a recording gap with which said surface is in bridging relationship, and having a coil coupled to said head, the steps of magnetically recording a pulse on said surface by sending current through said coil as said surface and said head pass each other, and sensing the magnetically recorded pulse before the fringing field from said recorded pulse has left said gap on the same pass.

2. In a method of verification employed in recording on a magnetic surface by means of a recording head having a recording gap with which said surface is in bridging relationship and having a coil coupled to said head, the steps of magnetically recording a signal on said surface by sending current through said coil as said surface and said gap pass each other, sensing the trailing edge of the magnetically recorded signal on the same pass and before the fringing field from said recorded signal has left said gap, and strobing the output from said coil.

3. The combination comprising a combined recording and reading device, a magnetic recording medium positioned adjacent said device and being movable relative thereto, means for applying an electrical signal to said device for magnetizing an elemental area of said medium, an amplifier connected at its input to said device, and means for strobing the output of said amplifier while said device is reading the trailing edge of said area on the same pass of said medium relative to said device.

4. The combination comprising a combined reading and recording device, a magnetic recording medium positioned adjacent said device and being movable relative thereto, means for applying a signal to said device for magnetically recording a mark on said medium adjacent said device, an electrical switch connected at its input to said device, and means for closing said switch while said device is reading the trailing edge of said mark on the same pass of said medium relative to said device.

5. The combination comprising a combined recording and reading device, a magnetic recording medium positioned adjacent said device and being movable relative thereto, means for applying a signal to said device for magnetizing an area on said medium adjacent said device, an amplifier connected at its input to said device, an electrical switch connected to receive the output from said amplifier, and means for strobing said switch before the trailing edge of said area moves out of the reading range of said device on the same pass of said medium relative to said device.

6. The combination comprising a combined magnetic recording and reading device, a magnetic recording medium positioned adjacent said device and being movable relative thereto, means for applying a signal to said device for magnetizing an elemental area on said medium, a negative feedback amplifier connected at its input to said device, and means for strobing the output of said amplifier while the trailing edge of said area is being read by said device on the same pass of said medium relative to said device.

7. The combination comprising a combined magnetic recording and reading head, a magnetic recording surface positioned adjacent said head and being movable relative thereto, an energizing coil linking a portion of said head, means for applying an electrical signal to said coil for magnetizing an area of said medium adjacent said head, an amplifier connected at its input to said coil, means for limiting the amplitude of the input to said amplifier, and means for strobing the output of said amplifier before the trailing edge of said area passes beyond the reading range of said head on the same pass of said medium relative to said head.

8. The combination comprising a combined magnetic recording and reading head having an air gap, a magnetic recording medium bridging said air gap and being movable relative to said head, means for applying a signal to said head for magnetizing an area of said medium including the portion of said medium bridging said air gap, a negative feedback amplifier connected at its input to said head, an electrical switch connected to receive the output of said amplifier, and means for closing said switch before the trailing edge of said area passes beyond said air gap on the same pass of said medium relative to said head.

9. The combination comprising a combined magnetic recording and reading head, a magnetic recording surface positioned adjacent said head and being movable relative thereto, means for applying a signal to said head for magnetizing an area on said medium, an amplifier connected at its input to said head, means for limiting the amplitude of the input to said amplifier, a switch connected to receive the output of said amplifier, and means for closing said switch while the trailing edge of said area is being read by said head on the same pass of said medium relative to said head.

10. The combination comprising a combined magnetic recording and reading head, a magnetic recording surface positioned adjacent said head, a switch connected at its input to said head, an amplifier connected to receive the output of said switch, an inhibit gate having a pair of input terminals, one of said pair being connected to the output of said amplifier, and means for applying a strobe signal to said switch and to the other terminal of said pair while said head is reading the trailing edge of said area on the same pass of said medium relative to said device.

11. The combination comprising a combined magnetic recording and reading head, a magnetic recording surface positioned adjacent said head, a switch connected at its input to said head, an inhibit gate having a signal input terminal and an inhibit input terminal, said inhibit input terminal being connected to the output of said switch, and means for applying a strobe pulse to said switch and to said signal input terminal while the trailing edge of said area is being read by said head on the same pass of said medium relative to said head.

12. The combination comprising a combined magnetic recording and reading head having an air gap, an energizing coil linking a portion of said head, a magnetic recording surface bridging said air gap and being movable relative to said head, means for applying an electrical signal to said coil for magnetizing an area of said medium including the portion of said medium bridging said air gap, an amplifier connected at its input to said coil, and means for enabling the output of said amplifier before the trailing edge of said area passes beyond said air gap on the same pass of said medium relative to said head.

References Cited in the file of this patent

UNITED STATES PATENTS

| | | |
|---|---|---|
| 2,700,148 | McGuigan et al. | Jan. 18, 1955 |
| 2,789,026 | Nordyke | Apr. 17, 1957 |
| 2,845,610 | Cornell et al. | July 29, 1958 |
| 2,886,800 | Murphy | May 12, 1959 |